United States Patent [19]

Fuminier

[11] 4,429,445

[45] Feb. 7, 1984

[54] MACHINE FOR REMOVING BURRS FROM PIPE

[75] Inventor: Claude B. Fuminier, Pont-a-Mousson, France

[73] Assignee: Pont-a-Mousson S.A., Nancy, France

[21] Appl. No.: 264,330

[22] Filed: May 18, 1981

[30] Foreign Application Priority Data

May 30, 1980 [FR] France ............................ 80 12054

[51] Int. Cl.$^3$ ................... B23P 23/04; B21D 19/04
[52] U.S. Cl. ................................... 29/33 T; 72/105
[58] Field of Search .............. 29/33 T; 72/73, 74, 72/105; 82/82, 92, 4 C

[56] References Cited

U.S. PATENT DOCUMENTS

| | | | |
|---|---|---|---|
| 2,743,630 | 1/1956 | Tillis | 72/74 |
| 3,164,062 | 1/1965 | Hobden et al. | 82/4 C |
| 4,126,064 | 11/1978 | Tarrant | 82/92 X |
| 4,210,008 | 7/1980 | Birkestrand | 72/105 |

FOREIGN PATENT DOCUMENTS 2458670  6/1976  Fed. Rep. of Germany ...... 29/33 T

*Primary Examiner*—William R. Briggs
*Attorney, Agent, or Firm*—Sughrue, Mion, Zinn, Macpeak and Seas

[57] ABSTRACT

A cast-iron pipe having an end socket is rotated about its axis by a driven first roller applied against the outside of the socket and a driven second roller applied against the inside of the socket and pressing the latter against the first roller. The rollers can be rotated at differing speeds, and as the socket revolves they rub off or crush burrs or other irregularities on the outside and inside of the socket. A cutting tool on a pivoted lever arm is applied by motor power to an outer face of an end flange of the rotating socket to trim burrs therefrom. The second roller supported on an articulated arrangement can be swung into and out of the socket by operation of a first hydraulic jack. Another hydraulic jack arrangement presses the second roller against the inside of the socket and increases the pressure suddenly when the roller encounters a large irregularity and decreases the pressure to normal when that irregularity has passed the roller.

11 Claims, 9 Drawing Figures

MACHINE FOR REMOVING BURRS FROM PIPE

The invention relates to the finishing of sockets on cast-iron pipes produced by centrifugal casting. More precisely, it relates to a method and a machine for removing burrs from or for trimming a socket of a cast-iron pipe, i.e. for eliminating protuberances, roughness and projections of various forms possibly present on the inside and outside of this socket in the raw state after centrifugal casting.

It is known that cast-iron pipe, in the rough-cast state, may not pass a manufacturing inspection when their sockets comprise projections internally and/or externally, which are due either to fissures or cracks appearing in the casting mould after the latter has been in use for a long time, or to slight deteriorations or casting defects of the socket cores consisting of hardened sand used during centrifugal casting. When these projections form an external roughness, they may injure the operators employed to handle the pipes. When they are located on the inlet flange of the socket of a pipe, they may also reduce or impair the grip of a bolt head on this flange for producing a sealed joint between this socket and the male end of another pipe. Finally, when these protuberances are located inside the socket and in particular in the groove for housing the gasket, they may impair correct positioning and operation of the gasket in a pipe joint.

Naturally, these localized defects are rather rare, but their elimination prevents the rejection of complete pipes. This is why protuberances or roughness of this type are normally eliminated in finishing work which follows the centrifugal casting and naturally a manufacturing inspection which has discovered them.

Hitherto, this elimination was effected by manual grinding, which is a very noisy operation producing dust and possibly presenting risks for the operators.

The applicant tackled the problem of replacing this manual grinding by a method and machine reducing the noise and dust, presenting much smaller risks for the operators and ensuring high regularity and quality of work.

The present invention thus relates to a method for removing burrs from or trimming a socket of a cast-iron pipe, this method being characterised in that a region of the wall of the socket from which burrs are to be removed is clamped radially between inner and outer rotating rollers following the inner and outer profiles from which burrs are to be removed, whilst causing the pipe to rotate about itself.

The invention also relates to a machine for removing burrs from or for trimming the socket of cast-iron pipes intended for carrying out this method. This machine is characterised in that it comprises means for supporting a pipe and rotating this pipe about its own axis, two pressing rollers whereof the profile respectively follows the inner and outer profile of a region of the socket to be trimmed and displacement means for engaging these two rollers on the socket and for releasing the latter.

In a particularly advantageous embodiment, means are provided for pressing the rollers against the socket with a predetermined force and for increasing this force appreciably and momentarily in response to a sudden reaction exerted on one of the rollers by certain irregularities on the socket.

Further features and advantages of the invention will become apparent from the ensuing description, given as a non-limiting example and with reference to the accompanying drawings in which.

Figure 1:
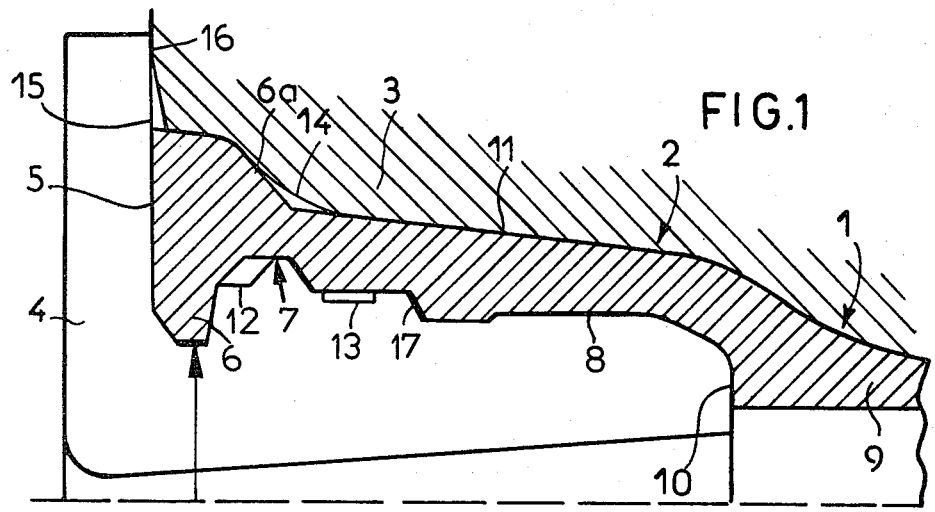
FIG. 1 is a partial half view in mid-section of a socket of a cast-iron pipe comprising various protuberances and irregularities and of the metal chill-mould and core of hardened sand which served for the casting of this socket.

According to the embodiment illustrated in the drawings, the invention is applied to the finishing of a cast-iron pipe 1 comprising a socket 2 at one end and which is produced by centrifugal casting in a chill-mould 3 of which only a small part is shown. The inner cavity of the socket 2 is formed by means of a core 4 of hardened sand. The socket core 4 provides the impression of the flat end face 5 of the socket, that of the inlet flange 6 of this socket, which has an inner diameter DI, the impression of the circular groove 7 for housing a gasket (not shown) and finally the impression of the chamber 8 at the bottom of the socket, which is connected to the cylindrical inner wall of the body 9 of the pipe by a radial shoulder 10. The chill-mould 3 provides the outer shape 11 of the socket 2.

In the rough-cast state, a socket 2 of a cast-iron pipe 1 cast in this way may have a certain number of casting defects. Certain of these defects are due to wear of the chill-mould 3 and to thermal stresses which it has undergone and which result in small fissures or cracks and other defects are caused by imperfections of the socket core 4 which may have been chipped upon introduction into the chill-mould 3 or may have been inadequately positioned on the latter, leaving a clearance, whereas other defects are due to imperfection in the insulation of the core with respect to the liquid cast-iron.

These defects are very exaggerated in FIG. 1 to make the explanation clearer. All categories of defect are illustrated, but naturally they are not all always present at the same time. Consequently, these defects are rather rare, but their elimination is justified in that it is not necessary to reject the entire pipe and for the reasons mentioned above.

Figure 2:
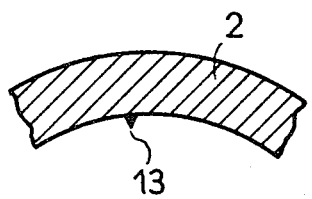
FIGS. 2 to 4 are partial views in cross-section of the various casting defects of this socket.
Figure 3:
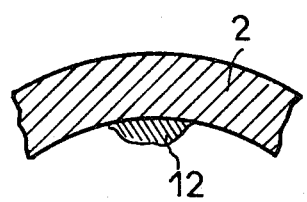
Figure 4:
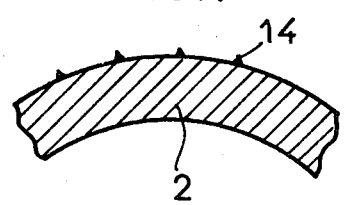

These defects, which are protuberances, projections or casting irregularities with respect to the surface which the socket is intended to have, are as follows (FIGS. 2 to 4).

Large protuberances or large localized accumulations of cast-iron 12 may occur in the groove 7 for accommodating the gasket, at the point where the socket core 4 comprises a relatively fragile annular projection which may have been chipped at the time of handling the core. These large protuberances may have a maximum projection of the order of several millimeters.

One also encounters fine elongated ribs 13 caused by surface cracks or slight crevices, having a depth of the order of 1 mm on the socket core 4 or in the vicinity of the inerface of the box or mould for the manufacture of the core when the latter closes poorly.

Outer ridges 14 can also be found, situated on the hollow curvature connecting the tulip-shaped part 11 to the outer rim 6a located in line with the inlet flange 6 of the socket. These outer ridges emanate from cracks in the chill-mould 3 due to wear of the latter.

External burrs 15 of cast-iron are also encountered on the peripheral edge of the inlet flange 6 of the socket, i.e. on the periphery of the end face 5 of the socket. These outer burrs or peripheral irregularities emanate from the poor application of the socket core 4 against the end face 16 of the chill-mould 3.

Finally, when the socket core 4 is insufficiently insulated from the molten cast-iron by a coating such as carbon black facilitating stripping, the surface of the core is impregnated with cast-iron, so that at the time of stripping the pipe, the hardened sand of the core 4 is superficially encrusted in the inner cavity of the cast-iron socket, in particular in the groove 7 for accommodating the gasket. This results in a rough inner wall 17.

Figure 5:
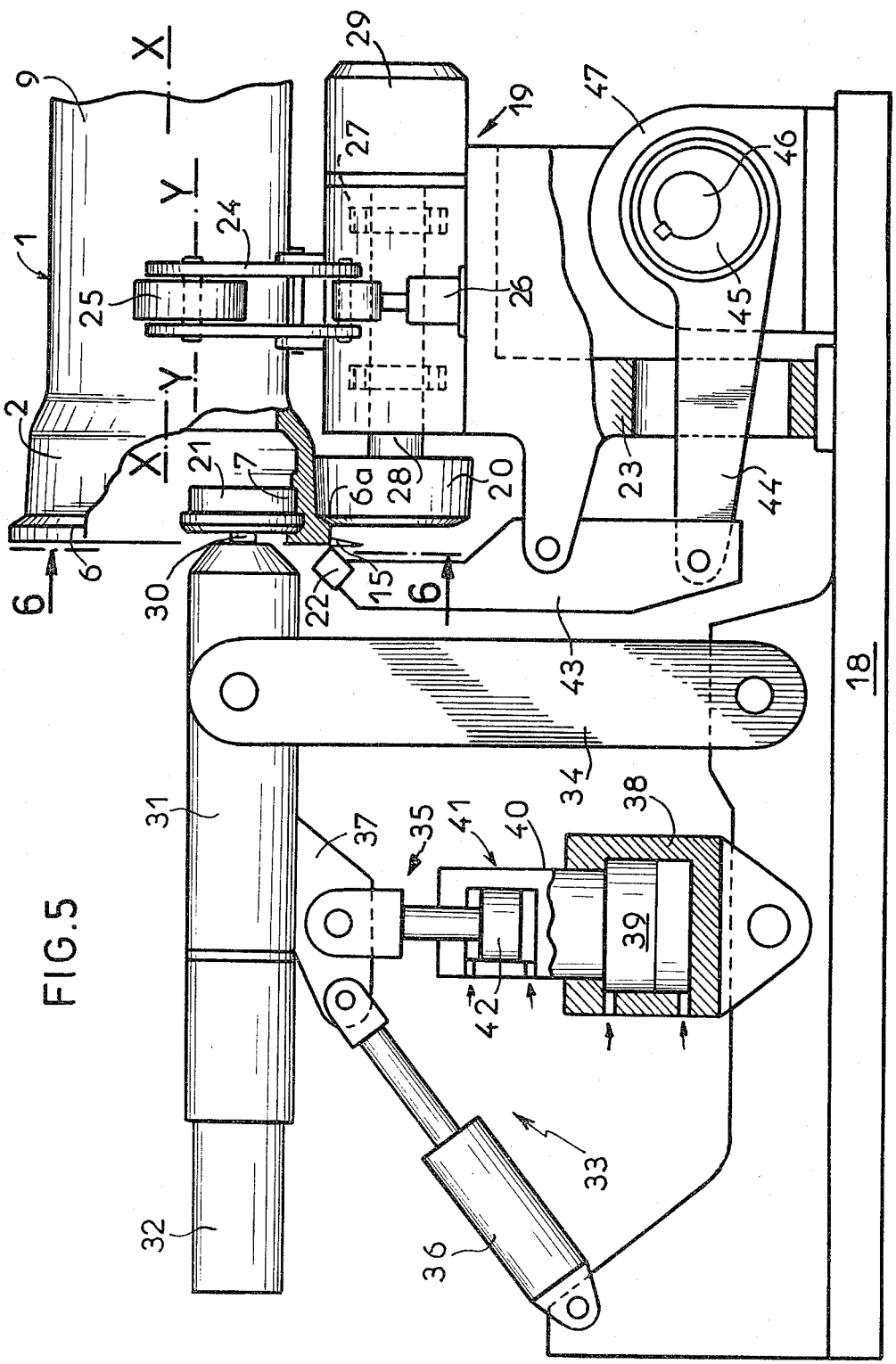
FIG. 5 is a diagrammatic view of a machine according to the invention for removing burrs, part of the view being cutaway and in partial section.
Figure 6:
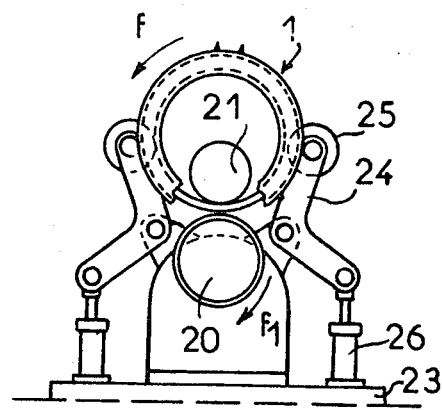
FIG. 6 is a diagrammatic view in cross-section on line 6—6 of FIG. 5.

These various casting defects are eliminated with the machine which will now be described with reference to FIGS. 5 to 7.

This machine comprises, supported by a frame 18, a support device 19, two trimming rollers 20 and 21 and a machining tool 22.

The support device 19 is intended to support a pipe 1 to be trimmed, the axis X—X of which pipe is horizontal. It comprises a certain number of uprights 23 on each of which are pivoted at their centre two bent levers 24 located in the same transverse plane and at their upper bifurcated end supporting a loose roller 25 for supporting the body of the pipe. A jack 26 is mounted between the frame and the lower end of each lever 24. The rollers 25 have axes Y—Y parallel to the axis X—X and both are located at the same level. By acting on the jacks 26, one adjusts the spacing of these rollers in order that this level is located slightly below the axis X—X, for a pipe of given diameter.

The upright 23 adjacent the socket 2 comprises bearings 27 for guiding the output shaft 28 of a speed-reducer unit 29 fixed to this upright. The shaft 28 whereof the axis is parallel to the axes X—X and Y—Y and is situated in the vertical plane of symmetry of the machine, can be seen at the side of the socket 2 and at this end supports an outer trimming roller 20, the profile of which matches the outer profile 11 of the socket and of the side face of the rim 6a directed towards the body of the pipe 1.

The profile of the inner trimming roller 21 matches the groove 7 of the socket. This roller 21, whereof the diameter is less than the diameter of the outer roller 20, is fixed to the front end of a shaft 30 mounted in a hollow spindle 31 and connected to a speed-reducer unit 32. The spindle 31 is supported by a pivoted device 33 constituted by a link 34, a double-acting jack 35 and a single-acting jack 36.

The link 34, which is approximately vertical in the active position (FIG. 5), is pivoted by its upper bifurcated end to the front end of the spindle 31 and by its lower end to the frame 18. The double-acting jack 35 is substantially parallel to the link 34 and pivoted at one end to the frame 18 and at the other end to a bracket 37 projecting below the rear end of the spindle 31. It comprises a lower body 38 in which a piston 39 slides in order to form a securing jack 40. The rod of the piston 39 of this jack, which emerges at the top, is hollow and constitutes the body of a calibration jack 41, of smaller diameter and length. The rod of the piston 42 of this jack is pivoted by a fork-joint to the bracket 37. Thus, the jacks 40 and 41 are arranged in series.

The jack 36 is located at the rear with respect to the double-acting jack 35 and is inclined at an angle of approximately 45°. It is pivoted at one end to the frame 18 and at the other end to the rear end of the bracket 37. The parts 34,35 and 36 of the pivoted device 33 are all generally situated in the longitudinal plane of symmetry of the machine and all the pivot points are horizontal and perpendicular to the axis X—X.

The machining tool 22, which does not rotate about the axis X—X, is fixed to the upper end of an approximately vertical lever 43. This lever is pivoted about pivots perpendicular to the axis X—X, by its centre on the adjacent upright 23 and by its lower end on one end of a link 44 which is approximately horizontal, which is pivoted at its other end on an eccentric 45 integral with the output shaft 46 of a speed-reducer unit 47 having two speeds and two directions of rotation. This control 43-44-45-46 is of the type described in French Patent Application No. 79.30 754. It comprises kinematic means ensuring rapid advance and return movements of the tool and a slow advance speed of this tool during machining of the pipe 1. The hydraulic control device for the double-acting jack 35 will now be described. As regards the inclined jack 36, this has a very simple double-acting pressurized fluid supply, which will not be described.

Figure 7:
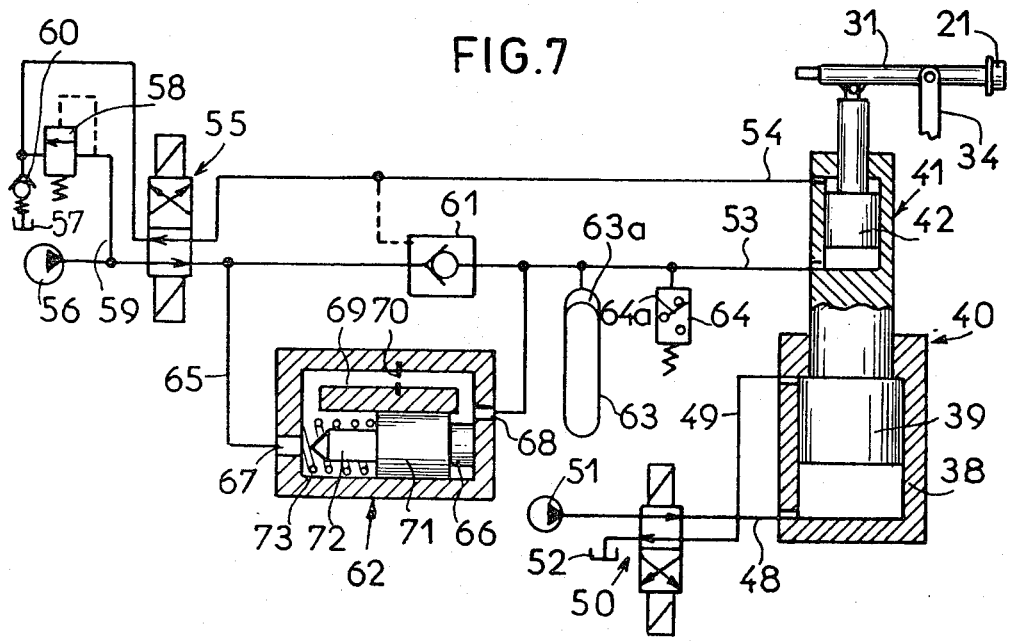
FIG. 7 is a diagrammatic view of the hydraulic control of this machine.

The hydraulic control of the jack 35 is illustrated in FIG. 7 in the working position. It comprises two independent supplies for the jacks 40 and 41.

The supply to the jack 40 is conventional: it comprises two conduits 48 and 49 carrying fluid under pressure and opening into the two ends of the body 38 and a slide-valve distributor 50 having two positions, one connecting one of the conduits 48,49 respectively to a supply of pressurized fluid by a pump 51 and to the tank at 52, the other position being the reverse position. The piston 39 of the jack 40 is in the lower position when the machine is inoperative and in the upper position when the machine is working.

The supply to the calibration jack 41 also comprises two conduits 53,54 carrying pressurized fluid and opening into the two ends of its body, a slide-valve distributor 55 having two positions, a pump 56 connected to a source of pressurized fluid and a tank 57. This conventional circuit is completed in the following manner.

The pump 56 is calibrated at a pressure p bars (of the order of 100 bars) by a calibration valve 58 which is connected in a loop on a branch of the conduit 59 connecting the conduits 53 and 54 and connected on the one hand between the pump and the distributor 55, on the other hand between the latter and a non-return valve 60, calibrated at several bars, which leads to the tank 57.

Mounted downstream of the distributor 55, in the conduit 53, is a non-return valve 61 controlled by the pressure of the conduit 54 and at the connections of which a valve 62 is connected in a loop. A pressure accumulator 63 of the known type, comprising a deformable membrane 63a, calibrated at a pressure which is a multiple of the pressure p provided by the pump 56, for example at a pressure 3p and a pressure gauge or pressure switch 64 calibrated at a pressure slightly less that that of the accumulator 63 but substantially greater than that provided by the pump 56, for example at a pressure of 2.5p, are connected to points of the conduit 53 located between the arrangement 61-62 and the jack 41. The pressure gauge 64 is arranged in order that its contact 64a moves when it is supplied with electrical contact, as soon as the pressure in the conduit 53 exceeds a predetermined high value, which is fixed for example at 2.5p, in order to produce a signal.

The special valve 62, connected in a circuit bypassing the non-return valve 61 in a branch conduit 65 has extremely eggagerated relative dimensions in FIG. 7 and is arranged in the following manner.

The valve 62 comprises a bore 66 open at its two ends by orifices 67 and 68 to the branch conduit 65, as well as a channel 69 forming a by-pass with respect to the bore 66. This channel 69 is provided with a diaphragm 70 limiting the rate of flow of the pressurized fluid passing therethrough to a low value. Sliding in the bore 66 is a piston 71 extended by a pointed member 72 able to close off the orifice 67 of the bore 66 closest to the distributor 55. A spring 73 is compressed between the piston 71 and the bottom of the bore 65 adjacent the orifice 67. This spring 73 normally tends to restore the piston 71 to a position abuting against the other end of the bore 66, in which position the by-pass channel 69 is connected to the branch conduit 65 by the orifices 67 and 68. The spring 73 is calibrated at a low force corresponding, taking the section of the piston 71 into account, to a pressure of the order of 2 bars on this piston, i.e. at a pressure much less than the pressure p.

The machine thus described operates as follows.

When inoperative (FIG. 8), the three jacks 36,40 and 41 are in the retracted position and the spindle 31 is thus in an oblique position, in the same manner as the link 34 and the double-acting jack 35. The inner roller 21 is raised and the tool 22 withdrawn, which makes it possible to place a pipe 1 on the lateral support rollers 25. The latter are adjusted, in accordance with the diameter of the pipe 1, so that the outer profile 11 of the socket 2 rests on the outer roller 20, which thus also serves as a support for the pipe 1 and more precisely for its socket 2. The three speed-reducer units 29,32 and 47 are stopped.

Starting up of the machine, trimming rollers 20 and 21 and cutting tool 22

The inclined jack 36 is supplied with pressurized fluid from the bottom. The inner roller 21 thus enters the socket 2. The supply of fluid to the jack 36 is stopped slightly before its end of travel, when the roller 21 is straight above the inner groove 7 of the socket. The link 34 is thus in its vertical position shown in FIG. 5.

The large holding jack 40 is supplied with pressurized fluid from the bottom. Its piston 39 comes into the upper position and will remain there throughout the operation of the machine, since its supply pressure is sufficient to withstand reactions of the piston 42 which will be discussed hereafter. The spindle 31 tilts about its pivot on the link 34 and the inner roller 21 approaches the groove of the socket 7 to be machined. When the large holding jack 40 is at the end of its travel (FIG. 5), the inner roller 21 is close to the groove 7 but not yet in contact with the latter, whereas the small force-calibrating jack 41 is still in the retracted position.

By bringing the distributor 55 into its position shown in FIG. 7, fluid at a pressure of p bars, with a high rate of flow, is sent into the lower chamber of the jack 41, through the valve 61. The roller 21 thus comes into contact with the inner groove 7 of the socket and its axis becomes parallel to the axis X—X. The jack 36 is once more supplied with fluid from the bottom in order to ensure, by an axial thrust exerted on the roller 21, a shearing effect which will make it possible to smooth off the outer ridges 14 of the socket.

The three speed-reducer units 29,32 and 46 are set in operation. Consequently, the pipe 1 is set in rotation in the direction of arrow f (FIG. 6) by the two motorized rollers 20 and 21 between which its socket 2 is clamped or pressed, the roller 20 rotating in the direction of arrow f1. The speed of rotation of the rollers is moderate and corresponds for example to a tangential speed of the order of 15 m/min. The large diameter roller 20 will act as a support or anvil crushing the irregularities which it may encounter, whereas the smaller diameter roller 21 will act as a smoothing tool. Finally, the cutting tool 22 approaches with a rapid advance movement then attacks the peripheral inlet edge of the socket 2.

The manner in which the various casting defects described above are eliminated, will now be described.

Elimination of the small irregularities 13 and 14

During several revolutions of the pipe 1 abouts its axis X—X, the socket 2 is pressed radially between the two rollers 20 and 21 under the effect of the holding jack 40 and force-calibrating jack 41 and subjected axially to a shearing force between the two rollers by the inclined jack 36, which presses the roller 21 on the transverse surfaces of the interior of the socket. The inclined jack 36 thus acts as a strut, the reaction being ensured by the roller 20. During this rotation (FIG. 9) and the rolling of the two rollers on the inner and outer walls of the socket 2, the forces of these rollers cause crushing of the small irregularities 13 and 14 and smoothing of the inner and outer profiles of the socket.

Elimination of the sand deposits 17

It was mentioned above that the groove 7 of the socket could be coated superficially with sand deposits agglomerated with the cast-iron. The roller 21 rolling on these grains of sand which are more or less coated with cast-iron crushes them, pulverizes them and detaches them from the surface of the cast-iron.

Elimination of outer burrs 15

The cutting tool 22 carries out a cycle of rapid approach until it comes into contact with the peripheral edge of the end face of the socket, of slow advance then rapid withdrawal during the revolutions of the socket. During its slow advance, it chamfers said peripheral edge by cutting the burrs 15, if they exist, at their base, thus quickly eliminating them by machining.

Elimination of large protuberances 12

Large protuberances 12, which are localized accumulations of cast-iron having a maximum projection of several millimeters with respect to the normal inner or outer surface of the socket, may exist essentially in the groove 7 of the socket, where the sand core 4 had relatively fragile considerable projections.

Figure 8:
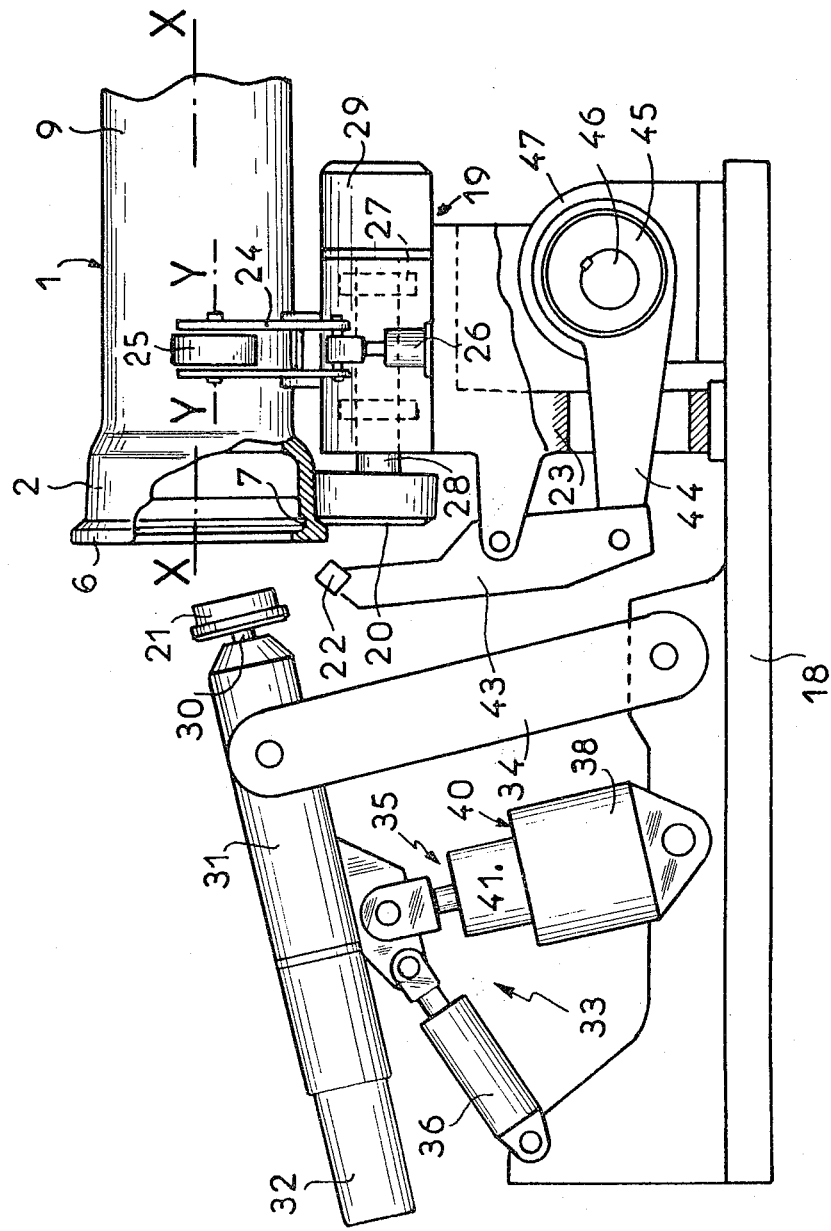
FIG. 8 is a view similar to FIG. 5, but on a smaller scale, of the machine in the inoperative position, the inner roller being extracted from the socket.

In the very rare case where this protuberance 12 is very large (due to the use of a broken core 4 for example), it is an obstacle to the rolling of the inner roller 21. The jammed pipe is immobilized. The two rollers 20 and 21 slip on the wall of the pipe. By means which are known and not described, the immobilization of the pipe is detected and this detection is indicated. This detection controls the stoppage of the machine and brings the latter into the inoperative position. By way of addition it marks the defective pipe, for example by a jet of paint. The stoppage of the machine occurs in the following sequence:

stoppage of the two speed-reducing units 29 and 32;

raising of the inner roller 21 by supplying fluid to the vertical jacks 40 and 41 from the rod side, which causes tilting of the spindle 31 about its pivot on the link 34. At the time of this operation, the control for the valve 61 opens the latter, which facilitates a return of the fluid to the tank 57 with a high rate of flow;

withdrawal of the inner roller 21 by supplying fluid to the inclined jack 36 at the rod side, which causes the withdrawal of the spindle 31. The position is thus as shown in FIG. 8.

If on the contrary, the inclination of the large protuberance 12 is slight, which is most frequently the case, when the roller 21 reaches this protuberance, it climbs the latter.

On account of the hydraulic operation described hereafter, the pressure prevailing in the calibrating jack 41 rises momentarily to the value 3p, which assists in crushing the large protuberance or boss 12. It should be noted that it is not possible to maintain this pressure 3p throughout the entire working stage of the machine, since there would be a danger of rolling the socket of the pipe and thus of elongating the latter, i.e. of increasing its diameter, which must naturally be prevented.

The hydraulic members are located in the position shown in FIG. 7. The supply pressure to the jack 40 is sufficient for the piston 39 to remain correctly in abutment in the upper position throughout the operation described hereafter.

The operation of the special valve 62 will be examined in more detail at the time of the operation of the rollers 20 and 21, during the rotation of the pipe 1.

If the inner surface of the socket, thus of the groove 7, is slightly eccentric with respect to the outer profile 11 owing to a slight eccentricity of the core 4 with respect to the chill-mould 3, which causes a variation of the thickness of the pipe on its periphery, but if the groove 7 comprises neither an irregularity 13, nor protuberance 12 (satisfactory surface of the core 4), the roller 21 exerts a constant radial force Q on the groove 7, due to the pressure of the fluid p admitted through the conduit 53 into the small jack 41 at the bottom. Since the groove 7 of the socket is slightly eccentric, there is a slow alternating movement of the piston 42 of the jack 41 during the revolutions of the pipe 1. The useful pressure p of the jack 41 is kept constant by virtue of the diaphragm 70 of the valve 62, which allows a slow circulation of fluid in both directions without an appreciable pressure drop. In fact, the controlled valve 61 is closed and the pressurized fluid coming from the supply pump 56 supplies the conduit 53 thus passing through the branch conduit 65 and consequently through the special valve 62. In this special valve 62, the piston 71 prevents the direct passage of pressurized fluid between the orifices 67 and 68 but allows the passage thereof through the diaphragm 70. Consequently, the force-carlibrating jack 41 remains supplied normally from the bottom with fluid at a pressure p, whereas adjacent the rod, it is connected by the conduit 54 to the tank 57.

The force Q exerted by the roller 21 is pre-established, in an experimental manner, so as:

not to deform the socket 2 by an excessive compression force, in order to prevent rolling;

to exert a sufficient force in order to pulverize and detach the grains of sand of the deposits 17; and to exert a sufficient force in order to remove and level the small irregularities such as 13.

When the roller 21 encounters a considerable protuberance 12, i.e. an important obstacle in its path of travel inside the socket, it rises suddenly in consideration of the relatively high tangential speed of the pipe 1. Consequently, the piston 42 of the jack 41 descends rapidly thus forcing the fluid back in the pipe 53 suddenly and as the valve 61 is closed, into the conduit 65 through the orifice 68 in the special valve 62. In the by-pass conduit 69, the fluid encounters the diaphragm 70 and consequently undergoes a considerable pressure drop which increases the pressure in the bore 66 to a valve $p^1$. The piston 71 is thus subject to opposing pressures $p^1$ adjacent the orifice 68 and p plus the force of the spring 73 adjacent the orifice 67. The predominant pressure $p^1$ causes the displacement of the piston 71 towards the outlet orifice 67, so that the latter is closed off by the pointed member 72. The special valve 62 is thus closed and the non-return valve 61 is also closed.

This closure of the special valve 62 due to closing-off of the orifice 67 by the pointed member 72 takes place very quickly, in a flash. The pressurized fluid coming from the lower part of the cylinder of the jack 41 through the conduit 53 is thus directed towards the accumulator 63, whereof the opposed chamber is pre-inflated with nitrogen at a pressure 3p. Thus, as soon as the special valve 62 closes, a pressure 3p is established adjacent the bottom of the jack 41, which pressure is provided by the accumulator 63, which immediately causes trebling of the crushing force on passing the protuberance 12.

With such a great force, upon each passage of the roller 21 over the protuberance 12, as the socket 2 revolves and consequently each time the roller passes over the top of the protuberance 12, the latter is quickly crushed until there is no longer any appreciable projection, i.e. which is troublesome for the satisfactory application of the gasket in the groove 7 of the socket.

Naturally, as soon as the protuberance 12 is passed, the supply pressure of the jack 41 returns to the value p and the valve 62 once more opens.

In practice one observes a sudden drop of the piston 42, under the effect of the protuberance 12. If the roller 21 succeeds in crossing the top of the large protuberance 12, the piston 42 of the jack 41 rises rapidly and the roller 21 continues its travel and, at the time of each revolution of the socket 2, crushes the top of the protuberance 12 a little more. In principle, after several revolutions of the pipe, the roller 21 will have crushed or made this protuberance disappear. This wearing-away of the top is illustrated in FIG. 9 by the successive lines $12^a$, $12^b$, $12^c$ indicating the peak.

Figure 9:
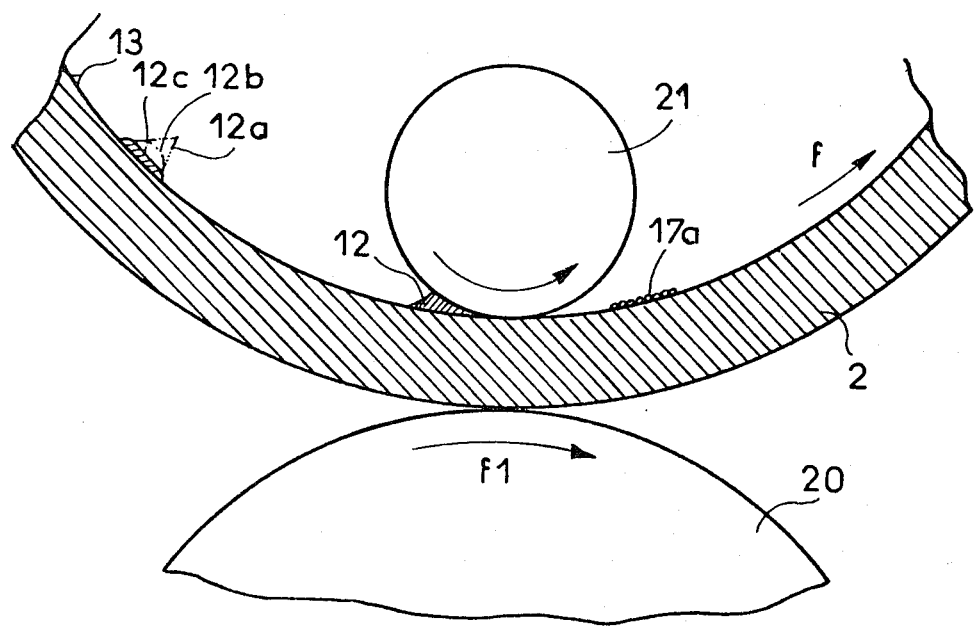
FIG. 9 is a diagrammatic end view, to an enlarged scale, showing the socket and the rollers during crushing of the protuberances and irregularities of the socket.

As an example, FIG. 9 also shows diagrammatically a small irregularity 13, grains of sand $17^a$ detached from the socket 2 and an additional protuberance 12 on which the roller 21 prepares to climb for the purpose of crushing it.

However, one may have to deal with a particularly large protuberance 12, though the latter may not be sufficiently large to initiate the slipping indicator which stops the machine. In this case, the protuberance 12 remains insufficiently crushed and is not completely eliminated after the few revolutions (for example five revolutions) provided for removing the burr.

Under these conditions, the machine undertakes automatic control, i.e. it indicates the remainder of a protuberance 12 (peak line 12$^c$) not completely eliminated. For this, the pressure gauge 64 provided in the conduit 53 is supplied with electrical power and in addition to the several revolutions which it has carried out during the working phase, i.e. for crushing and removing sand, the socket 2 carries out an additional revolution for the purpose of initiating a signal indicating non-complete elimination of a large protuberance 12.

Thus, if a residual protuberance 12 exists, for example a projection greater than 0.15 mm, the special valve 62 having closed as mentioned above and the pressure below the piston 42 having passed to the value 3p on account of the accumulator 63, the pressure gauge 64 which is calibrated at a pressure slightly less than 3p, for example at 2.5p, actuates its switch 64$^a$, which, by means which are known and not shown, provides the information or signal indicating a "residual protuberance". This signal is used to mark the insufficiently smoothed pipe, for example by spraying a jet of paint. Then the machine returns to a stationary position and stops as previously described.

During this automatic control revolution, where there is a need for great sensitivity with a view to measuring very small residual protuberances, of the order of 0.15 mm, one is normally impeded by the compressibility of the oil used as the pressurized fluid and by the expansion of the hydraulic members and conduits.

In order to obtain maximum sensitivity, it is necessary on the one hand to reduce the lengths of the conduits to the maximum and thus to locate the members 61 to 64 as close as possible to the jack 41, on the other hand to work with a reduced volume of oil, which explains the use of the two jacks in series 40 and 41. The calibration jack 41 has a small stroke and a small volume of oil, thus a small deflection owing to the compressibility of the oil. The holding jack 40 is over-sized as regards diameter and pressure with respect to the jack 41 and contains a great deal of oil for its travel. It has solely a handling function. During the working stage of the machine, it also remains in forward abutment. The phenomenon of compressibility of the oil is of no concern to the latter, but concerns only the small volume of the small chamber adjacent the bottom of the small jack 41 and the short connecting pipework. Consequently, the incidence of the compressibility and expansions is very small and the accuracy of crushing and detection is great.

It should be noted that protuberances may also exist on the flat side walls of the groove 7 of the socket 2. If these protuberances are small, they are sheared-off by the passage of the roller 21, the shape of which complements that of the groove 7. If they are considerable, the roller 21 will endeavour to pass thereover and the procedure will be as described above with regard to protuberances 12 at the bottom of the groove: the supply pressure to the jack 42 will rise from p to 3p, and either the protuberance will be levelled, at least partially, or the rotation of the pipe will be stopped, which will cause stoppage of the machine. In addition, the supporting force of the inclined jack 36 will contribute to smoothing of the inner side wall (on the right in FIG. 5) of the groove 7.

As a variation, if one wishes to create a friction and abrasion effect of the inner roller 21 with regard to sand deposits 17, different tangential speeds may be imparted to the inner and outer rollers 21 and 20 respectively by a suitable control of the speed-reducer units 29 and 32. The socket 2 thus rotates at approximately the mean tangential speed and the two rollers 20 and 21 rub on the socket, thus contributing more effectively to the elimination of all the irregularities. In particular, the inner roller 21 produces a grinding and polishing effect thus further facilitating the removal of the deposit 17.

The embodiments of the invention in which an exclusive property or privilege is claimed are defined as follows:

1. A machine for removing burrs from or trimming sockets of cast-iron pipes, comprising: a machine frame (18), means for supporting a pipe (1) above said frame and for rotating the pipe about its longitudinal axis, two pressing rollers (20, 21) having profiles which individually follow the respective inner and outer profiles of a region of the socket (2) to be trimmed, and displacement means for radially clamping the two rollers against opposite sides of the region of the socket to be trimmed and for subsequently releasing the rollers from the socket, an outer one (20) of said rollers being fixedly mounted to said machine frame and comprising part of said supporting means, said displacement means including a pivoted quadrilateral structure, means mounting an inner one (21) of said rollers on a first side of said structure, second and third sides of said structure adjacent said one side comprising, respectively, a link member (34) and a force-calibrating hydraulic jack (41), and a diagonally oriented jack (36) pivotally disposed between said machine frame and an intersection point of said first and third structure sides.

2. A machine according to claim 1, characterised by means for driving at least one of the two rollers.

3. A machine according to claim 1, characterised by a tool (22) for machining a peripheral edge of an end face of said socket.

4. A machine according to claim 3, characterised in that the machining tool is supported by one end of a lever (43) mounted to pivot at an intermediate point about an axis which is transverse with respect to the axis of rotation of the pipe.

5. A machine according to claim 1, characterised in that a circuit for supplying the force-calibrating jack comprises means for providing a predetermined pressure, and means for momentarily preventing the return of hydraulic fluid in response to a sudden reaction exerted towards the axis of the pipe on the inner roller.

6. A machine according to claim 5, characterised in that the means for preventing the return of the hydraulic fluid comprises, in parallel on a line for supplying the force-calibrating jack, a non-return valve and a second valve itself comprising in parallel a restricted first conduit and a second conduit in which slides a piston loaded by a spring and provided with a member for closing off an orifice of the second valve located adjacent a side where hydraulic fluid is supplied.

7. A machine according to claim 5, characterised in that provided downstream of said preventing means is a pressure accumulator calibrated at a second pressure greater than said predetermined pressure, so that the preventing means causes the supply pressure to pass momentarily from this predetermined pressure to said second pressure.

8. A machine according to claim 5, characterised in that provided downstream of said preventing means is a hydraulic pressure controlled switch for checking the removal of burrs, and means for supplying this switch with electrical current at the end of the burr-removal.

9. A machine according to claim 8, characterised in that the force-calibrating jack is connected in series with a holding jack having a much greater travel and developing a much greater force.

10. A machine according to claim 9, characterised in that the inner roller has a smaller diameter than the outer roller.

11. A machine according to claim 1, wherein a fourth side of said pivoted quadrilateral structure comprises said machine frame.

* * * * *